US011125882B1

(12) United States Patent
Chen et al.

(10) Patent No.: US 11,125,882 B1
(45) Date of Patent: Sep. 21, 2021

(54) LASER PULSE SAMPLING AND DETECTING CIRCUIT, SYSTEM, AND METHOD

(71) Applicant: PHOTONIC TECHNOLOGIES (SHANGHAI) CO., LTD., Shanghai (CN)

(72) Inventors: Xuefeng Chen, Shanghai (CN); Yuwei Wang, Shanghai (CN); Yuan Li, Shanghai (CN); Tao Xia, Shanghai (CN); Yifan Wu, Shanghai (CN); Pei Jiang, Shanghai (CN)

(73) Assignee: PHOTONIC TECHNOLOGIES (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/319,259

(22) Filed: May 13, 2021

(30) Foreign Application Priority Data

Jun. 22, 2020 (CN) .......................... 202010570642.0

(51) Int. Cl.
*G01S 17/89* (2020.01)
*G01S 17/894* (2020.01)
(Continued)

(52) U.S. Cl.
CPC ............ *G01S 17/894* (2020.01); *G01S 7/484* (2013.01); *G01S 7/4814* (2013.01); *G01S 7/4861* (2013.01)

(58) Field of Classification Search
None
See application file for complete search history.

(56) References Cited

U.S. PATENT DOCUMENTS

| 4,891,649 A | * | 1/1990 | Labaar | G01S 7/2921 342/175 |
| 5,291,262 A | * | 3/1994 | Dunne | G01S 17/14 356/5.06 |

(Continued)

FOREIGN PATENT DOCUMENTS

| CN | 1789947 A | 6/2006 |
| CN | 101409553 A | 4/2009 |

(Continued)

OTHER PUBLICATIONS

Rui Zhang, narrow pulse semiconductor laser power measurement and calibration technologies research, CNKI China Excellent Master's Thesis Database Online Periodical, Dec. 31, 2010, pp. 3-20, Issue 7, online.

*Primary Examiner* — Hovhannes Baghdasaryan
(74) *Attorney, Agent, or Firm* — Rankin, Hill & Clark LLP

(57) ABSTRACT

A laser pulse sampling and detecting circuit includes: a laser driver which is driven by a triggering signal for generating laser pulse signal; a photoelectric converter for converting the laser pulse signal into current pulse signal; an amplifier for amplifying and converting the current pulse signal into voltage pulse signal; an ADC which is driven by a sampling clock signal for sampling the voltage pulse signal and performing analog-to-digital conversion on the voltage pulse signal, so as to obtain output signal of the ADC; a detector for detecting the output signal of the ADC, so as to obtain peak power and FWHM of the laser pulse signal; and a clock generator for generating the sampling clock signal. Phase of the sampling clock signal consecutively changes with respect to the triggering signal.

20 Claims, 2 Drawing Sheets

(51) Int. Cl.
  *G01S 7/484* (2006.01)
  *G01S 7/4861* (2020.01)
  *G01S 7/481* (2006.01)

(56) References Cited

U.S. PATENT DOCUMENTS

| | | | |
|---|---|---|---|
| 6,424,197 B1 * | 7/2002 | Salcedo | H03K 5/06 |
| | | | 327/175 |
| 2016/0365846 A1 * | 12/2016 | Wyland | G01S 17/14 |
| 2017/0356985 A1 * | 12/2017 | Yoshino | G01S 17/42 |

FOREIGN PATENT DOCUMENTS

| | | |
|---|---|---|
| CN | 102353446 A | 2/2012 |
| CN | 102594338 A | 7/2012 |
| CN | 104635211 A | 5/2015 |
| CN | 104697632 A | 6/2015 |
| CN | 105258794 A | 1/2016 |
| CN | 106209093 A | 12/2016 |
| CN | 106407153 A | 2/2017 |
| CN | 106899290 A | 6/2017 |
| CN | 110299911 A | 10/2019 |

* cited by examiner

LASER PULSE SAMPLING AND DETECTING CIRCUIT, SYSTEM, AND METHOD

CROSS-REFERENCE TO RELATED APPLICATIONS

The present application claims priority to allowed Chinese patent application Ser. No. CN202010570642.0, filed on Jun. 22, 2020, which has issued as CN111458695B on Oct. 27, 2020, the contents of which are incorporated by reference in their entirety.

BACKGROUND

Distance sensing techniques with high precision, high resolution and real-time ranging functions are widely applied in technical implementations such as autopilot, gesture recognition, and machine vision. Accordingly, Light Detection and Ranging (LiDAR) and 3D imaging technologies that are based on Time-of-Flight (TOF) are widely adopted.

TOF-based LiDAR and 3D imaging technologies involve a combination of a transmitter end and a receiver end. The transmitter end generates a pulse-modulated laser signal, and the receiver end detects the light signal reflected from the target object and calculates the distance from the target object based on the flight time of photons. With respect to a Direct-Time-of-Flight (DTOF) system, the detection distance and precision are mainly affected by the peak power and full width at half-maximum (FWHM) of the light pulses at the transmitter end and the sensitivity at the receiver end. In order for realizing the ranging function at a specific distance, the transmitter end has to make sure that it can output laser pulses with controllable and stable peak power and FWHM.

The circuits of the transmitter end and the laser devices driven by the transmitter end are sensitive to process deviations, power supply voltage deviations, and temperature changes, also called Process-Voltage-Temperature (PVT) changes. PVT changes cause deviations in the peak power and FWHM of the output laser pulses. The three factors of PVT changes mainly cause deviations from three aspects: first, during the working process of the transmitter end, changes over time and the temperature of the surrounding environment may change the temperature of the transmitter end; second, some process deviations may exist during the manufacturing process of the internal circuits of the transmitter end; third, the power supply voltage for the transmitter end may deviate. As such, the three factors of PVT changes will cause deviations in the peak power and FWHM of the output laser pulses, therefore making it difficult for realizing the ranging function at a specific distance.

In order to precisely control the peak power and FWHM of the output laser pulses, the transmitter end of the DTOF system must be able to automatically adjust the peak power and FWHM of the output laser pulses. However, because the peak power of the output laser pulses of the DTOF system is very high, like 5 watts to 12 watts, while the FWHM is very narrow, like 1 nanosecond (ns), products at present cannot achieve precise sampling and detecting of such high-speed laser pulses.

Accordingly, improvements can be made in TOF-based LiDAR and 3D imaging technologies to automatically adjust and precisely control the peak power and FWHM of the output laser pulses in light of high peak power and narrow FWHM.

SUMMARY

In view of the foregoing, a laser pulse sampling and detecting circuit includes: a laser driver which is driven by a triggering signal for generating laser pulse signal; a photoelectric converter for converting the laser pulse signal into current pulse signal; an amplifier for amplifying and converting the current pulse signal into voltage pulse signal; an analog-to-digital converter (ADC) which is driven by a sampling clock signal for sampling the voltage pulse signal and performing analog-to-digital conversion on the voltage pulse signal, so as to obtain output signal of the ADC; a detector for detecting the output signal of the ADC, so as to obtain peak power and FWHM of the laser pulse signal; and a clock generator for generating the sampling clock signal, phase of the sampling clock signal consecutively changes with respect to the triggering signal. The clock generator further includes: a plurality of delayers which are connected in a series connection and for sequentially delaying the triggering signal to generate a plurality of delay signals, and a multiplexer for sequentially outputting the plurality of delay signals according to a path selection control signal so as to generate the sampling clock signal, the path selection control signal is generated by counting on each rising edge of the triggering signal.

Also, a 3D sensing system includes: a laser driver which is driven by triggering signal for generating laser pulse signal; a photoelectric converter for converting the laser pulse signal into current pulse signal; an amplifier for amplifying and converting the current pulse signal into voltage pulse signal; an ADC which is driven by a sampling clock signal for sampling the voltage pulse signal and performing analog-to-digital conversion on the voltage pulse signal, so as to obtain output signal of the ADC; a detector for detecting the output signal of the ADC, so as to obtain peak power and FWHM of the laser pulse signal; and a regulator for controlling the laser driver according to the peak power and the FWHM of the laser pulse signal obtained by the detector. The sampling clock signal is generated by sequentially delaying the triggering signal, phase of the sampling clock signal consecutively changes with respect to the triggering signal.

Also, a laser pulse sampling and detecting method includes: generating laser pulse signal driven by triggering signal, and converting the laser pulse signal into current pulse signal; amplifying and converting the current pulse signal into voltage pulse signal; sequentially delaying the triggering signal to generate a sampling clock signal, sampling the voltage pulse signal driven by the sampling clock signal and performing analog-to-digital conversion on the voltage pulse signal so as to obtain a signal after analog-to-digital conversion, phase of the sampling clock signal consecutively changes with respect to the triggering signal; and detecting the signal after analog-to-digital conversion, so as to obtain peak power and FWHM of the laser pulse signal.

List of reference numbers and their corresponding elements: 10 sampling and detecting circuit, 100 laser driver, 200 photoelectric converter, 300 linear transimpedance amplifier, 400 low-speed ADC, 500 peak power/FWHM detector, 600 multi-phase clock generator, 601 delayer, 602 counter, 603 multiplexer, 604 DLL, 6041 delay replication module, 6042 delay detection module, 20 peak power/FWHM regulator.

DETAILED DESCRIPTION

Figure 1:
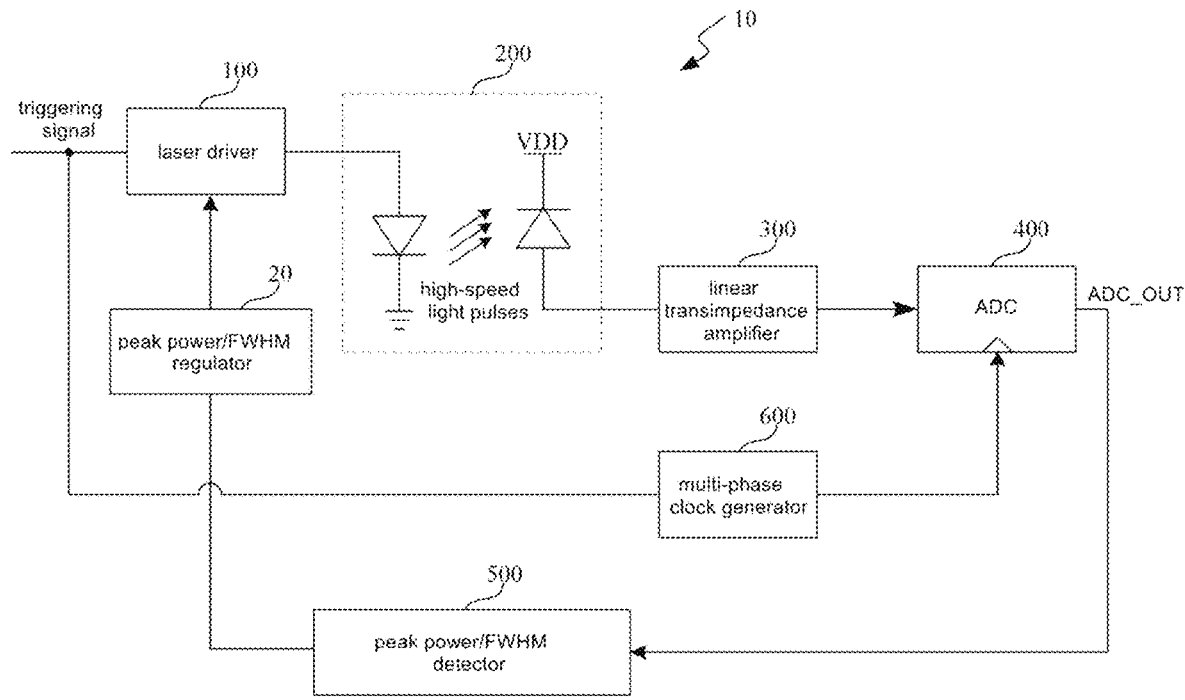
FIG. 1 is a schematic diagram illustrating a sampling and detecting circuit of the transmitter end of a LiDAR/3D sensing system.
Figure 2:
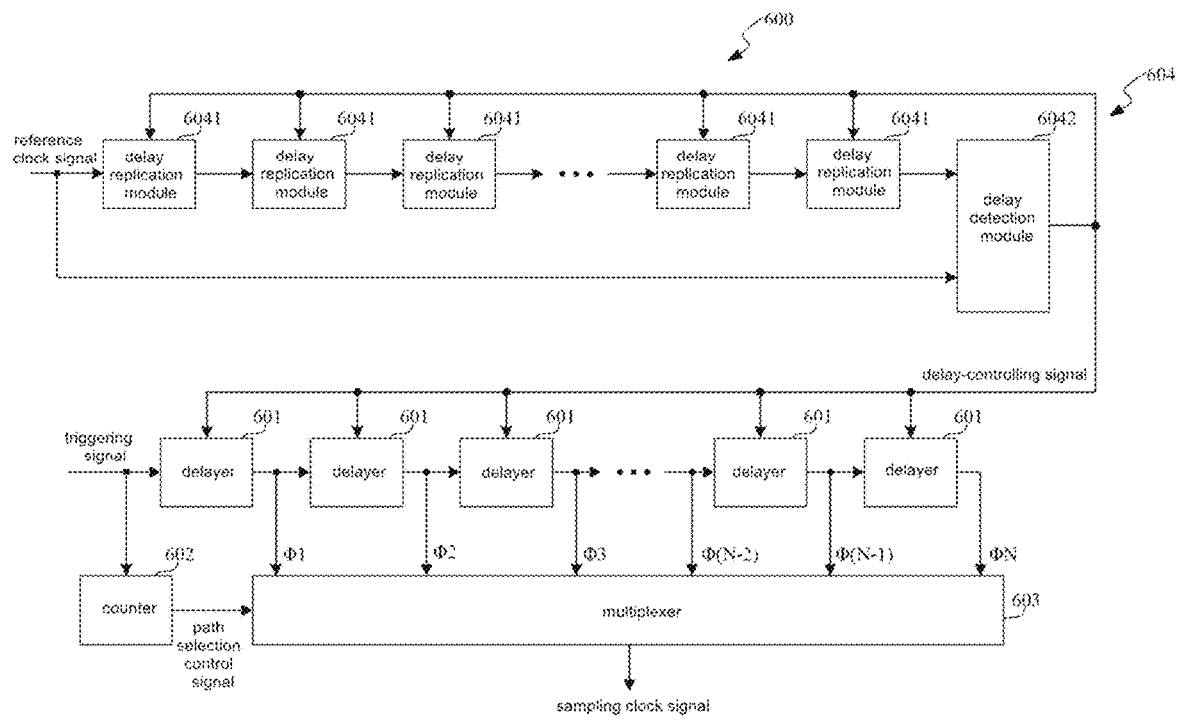
FIG. 2 is a schematic diagram illustrating a circuit of the multi-phase clock generator.
Figure 3:
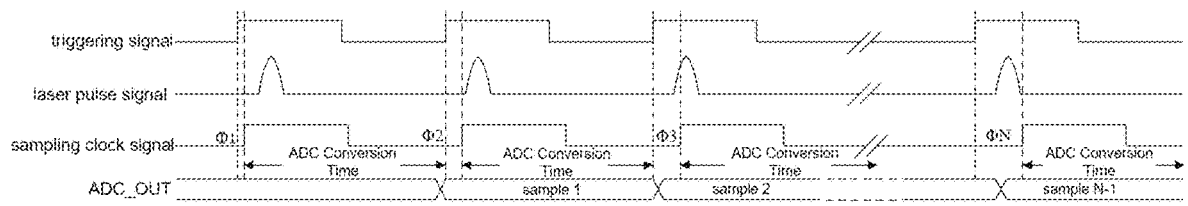
FIG. 3 is a schematic diagram illustrating time sequences of the sampling and detecting circuit.

With reference to FIG. 1, FIG. 2, and FIG. 3, it should be understood that the drawings and these embodiments only illustrate basic ideas of the invention in a schematic way, and the components as shown in the drawings are illustrating not limiting. Implementations of the invention may include components that have a different shape, quantity, or proportion, and the layout of the components may be more complicated.

FIG. 1 illustrates a sampling and detecting circuit of the transmitter end of a LiDAR/3D sensing system, for example a high-speed laser pulse sampling and detecting circuit. The sampling and detecting circuit 10 includes: a laser driver 100, used to generate a laser pulse signal driven by a triggering signal; a photoelectric converter 200, connected to the output end of the laser driver 100 and used to convert the laser pulse signal into a current pulse signal; a linear transimpedance amplifier 300, connected to the output end of the photoelectric converter 200 and used to amplify the current pulse signal then converted into a voltage pulse signal; a low-speed ADC 400, connected to the output end of the linear transimpedance amplifier 300 and used for sampling the voltage pulse signal and performing analog-to-digital conversion under the driving of the sampling clock signal; a peak power/FWHM detector 500, connected to the output end of the low-speed ADC 400 and used to detect the output signal ADC_OUT of the low-speed ADC to obtain the peak power and FWHM of the laser pulse signal.

The multi-phase clock generator 600 is connected to the clock input end of the low-speed ADC 400 and is used to generate the sampling clock signal, according to the triggering signal, whose phase changes continuously with respect to the triggering signal.

In some illustrated embodiments, the laser driver 100 can generate a high-speed laser pulse signal driven by the triggering signal; at the same time, the laser driver 100, driven by the triggering signal, may also adjust the peak power and FWHM according to the adjustment control signal input from the control end, so as to generate high-speed laser pulse signal with specific peak power and FWHM.

In some illustrated embodiments, with reference to FIG. 1, the photoelectric converter 200 includes: a transmitter photodiode and a receiver photodiode. The anode end of the transmitter photodiode is connected to the output end of the laser driver 100, the cathode end of the transmitter photodiode is grounded, and the receiver photodiode is grounded. The cathode end of the receiver photodiode is connected to the power supply voltage VDD, and the anode end of the receiver photodiode is connected to the input end of the linear transimpedance amplifier 300. In this illustrated example, the transmitter photodiode and the receiver photodiode are both high-speed photodiodes, so as to realize the conversion of high-speed laser pulse signal into current pulse signal.

In some illustrated embodiments, the linear transimpedance amplifier 300 is a high-speed linear transimpedance amplifier, so as to realize the amplification and conversion of the current pulse signal into voltage pulse signal. In this illustrated example, the high-speed linear transimpedance amplifier may be implemented by any suitable circuit or circuitry that can realize the above-mentioned functions, and this illustrated example does not limit its specific circuit composition.

In some illustrated embodiments, the low-speed ADC 400 realizes precise sampling of high-speed laser pulses under the driving of the sampling clock signal which is generated by the multi-phase clock generator 600 and whose phase continuously changes with respect to the triggering signal. Optionally, in this illustrated example, the low-speed ADC 400 is an asynchronous successive-approximation-register analog-to-digital converter.

In some illustrated embodiments, the peak power/FWHM detector 500 detects the output signal of the low-speed ADC 400 in the digital domain to obtain the peak power and FWHM of the laser pulse signal, so as to realize adjusting the peak power and FWHM of the high-speed laser pulse signal generated by the laser driver 100 according to the detection result, making that the peak power and FWHM do not change with changes in temperature, process angle or power supply voltage. The techniques for detecting the peak and FWHM in the digital domain may adopt any suitable technologies.

FIG. 2 illustrates a circuit of the multi-phase clock generator. The multi-phase clock generator 600 includes: N serially connected delayers 601, which are used to sequentially delay the triggering signal to generate N delay signals; a counter 602, which is used for counting once at each rising edge of the triggering signal, and generating a path selection control signal according to the counting result; a multiplexer 603 including N selection paths. The input ends of the N selection paths are respectively connected to the output ends of the N delayers 601 in a one-to-one correspondence, and the output ends of the N selection paths are used as the output of the multi-phase clock generator 600 to be connected to the clock input end of the low-speed ADC 400. The control end of the multiplexer 603 is connected to the output end of the counter 602, and is used to sequentially turn on the N selection paths according to the path selection control signal, such that the sampling clock signal, whose phase changes continuously with respect to the triggering signal, is generated according to the N delay signals. Optionally, the delay times of the N delayers 601 are the same, and N is a positive integer greater than 1.

In some illustrated embodiments, with reference to FIG. 2, the multi-phase clock generator 600 also includes a delay-locked loop (DLL) 604, used for generating a delay-controlling signal based on a reference clock signal to correct the delay times of the N delayers 601. Specifically, with reference to FIG. 2, the DLL 604 includes: N serially connected delay replication modules 6041, used to delay the reference clock signal sequentially; a delay detection module 6042, one input end of which is connected to the output end of the Nth delay replication module 6041, the other input end of which is connected to the reference clock signal, and output end of which is respectively connected to the N delay replication modules 6041 and the N delayers 601, used for comparing the delay value output of the Nth delay replication module with the period of the reference clock signal and generating the delay-controlling signal according to the comparison result. Optionally, the delay times of the N delay replication modules 6041 are the same, and are the same as the delay times of the N delayers 601.

With reference to FIG. 2, in some illustrated embodiments, the N serially connected delayers 601 delay the triggering signal, such that a latter delay signal has a fixed phase difference with respect to a former delay signal. For example, assuming the first delayer generates a delay signal that has a phase difference $\Delta\phi$ with respect to the triggering signal, and the second delayer generates a delay signal that has a phase difference $\Delta\phi$ with respect to the delay signal generated by the first delayer, and so on, till the Nth delayer generates a delay signal that has a phase difference $\Delta\phi$ with respect to the delay signal generated by the (N−1)th delayer. As such, the N delay signals are generated and named $\phi 1$, $1\phi 2$, $\phi 3$, all the way to $\phi(N-2)$, $\phi(N-1)$, and $\phi N$ respectively. And the counter 602 counts once at each rising edge of the triggering signal, and generates the path selection control signal based on the counting result. Consequently, when a respective delayer 601 generates the delay signal, the counter 602 by way of the path selection control signal controls a corresponding selection path of the multiplexer 603 to be open. For example, when the first delayer generates the delay signal, the path selection control signal generated by the counter 602 controls the first selection path to be open, such that the multiplexer 603 outputs the delay signal generated by the first delayer; when the second delayer generates the delay signal, the path selection control signal generated by the counter 602 controls the second selection path to be open, such that the multiplexer 603 outputs the delay signal generated by the second delayer; and so on, till the Nth delayer generates the delay signal, the path selection control signal generated by the counter 602 controls the Nth selection path to be open, such that the multiplexer 603 outputs the delay signal generated by the Nth delayer, thereby making the multiplexer 603 to sequentially open the N selection paths according to the path selection control signal, further allowing the multiplexer 603 to output sequentially the N delay signals, so as to generate the sampling clock signal whose phase changes consecutively with respect to the triggering signal. In implementations, in order to obtain the sampling clock signal whose phase consecutively changes, the phase difference between neighbor delayers must be precisely controlled, so this illustrated embodiment utilizes the DLL to correct the delay times of each delayer, to make sure that the delay times of the delayers do not change with changes in temperature, process angle or power supply voltage.

FIG. 3 illustrates time sequences of the sampling and detecting circuit. When the sampling and detecting circuit is performing the sampling process on the laser pulse signal, FIG. 3 illustrate the time sequences of the triggering signal, the laser pulse signal, the sampling clock signal, and the output signal ADC_OUT of the low-speed ADC. As shown in FIG. 3, on each rising edge of the triggering signal, the multi-phase clock generator 600 generates a sampling clock signal whose phase changes consecutively with respect to the triggering signal and sends the sampling clock signal to the low-speed ADC 400. Because the phase of the laser pulse signal has a fixed phase difference with respect to the triggering signal, under the control of the sampling clock signal, the low-speed ADC 400 may scan the entire waveform of the laser pulse signal to achieve precise sampling. The time precision of the scanning is determined by the step length of the phase changing of the sampling clock signal, which can usually reach 10 picoseconds (ps) or even lower. It should be understood that, during the sampling process, the sampling time points of the low-speed ADC 400 fall on each rising edge of the sampling clock signal, and because the period of the sampling clock signal is consistent with the period of the triggering signal, the conversion time of the low-speed ADC 400 is therefore determined by the period of the triggering signal, which means it is determined by the frequency of the triggering signal and it does not relate to the pulse width of the laser pulse signal.

In accordance with some exemplary embodiments of the present disclosure, a high-speed laser pulse sampling and detection method is provided. The method includes: generating a laser pulse signal driven by a triggering signal, and converting the laser pulse signal into a current pulse signal; amplifying the current pulse signal and converting them into a voltage pulse signal; according to the triggering signal, generating a sampling clock signal whose phase changes continuously with respect to the triggering signal; and sampling the voltage pulse signal and performing analog-to-digital conversion under the driving of the sampling clock signal; detecting the signal after the analog-to-digital conversion to obtain the peak power and FWHM of the laser pulse signal.

In some illustrated embodiments, generating the sampling clock signal whose phase changes continuously with respect to the triggering signal, includes: sequentially delaying the triggering signal for N times to generate N delay signals; counting on each rising edge of the triggering signal to generate a count result and generating a path selection control signal based on the count result; sequentially outputting N delay signals according to the path selection control signal, thereby generating the sampling clock signal whose phase changes continuously with respect to the triggering signal. The triggering signal is delayed for the same delay time for N times, and N is a positive integer greater than 1.

In some illustrated embodiments, the method for generating the sampling clock signal, according to the triggering signal, whose phase changes continuously with respect to the triggering signal further includes: generating a delay-controlling signal according to the reference clock signal, and correcting the delay times of the delayers respectively that generate the N delay signals.

In some illustrated embodiments, the method for generating the delay-controlling signal according to the reference clock signal includes: delaying the reference clock signal for N times in sequence; comparing the delay value output after the Nth delay with the period of the reference clock signal, and generating the delay-controlling signal according to the comparison result. The delay times of the N times delaying of the reference clock signal is the same and the same as the delay times of each of the delaying of the triggering signal.

With reference to FIG. 1, a LiDAR/3D sensing system is provided. The LiDAR/3D sensing system includes: a transmitter end and a receiver end. The transmitter end includes the high-speed laser pulse sampling and detecting circuit 10 used for sampling and detecting the laser pulse signal to obtain the peak power and FWHM.

With reference to FIG. 1, the transmitter end further includes: the peak power/FWHM regulator 20, which is connected to the output end of the peak power/FWHM detector 500 and the control end of the laser driver 100, and is used to detect the peak power and FWHM for generating an adjustment control signal to control the peak power and FWHM of the laser pulse signal output by the laser driver 100. Specifically, the laser driver 100 is driven by the triggering signal and adjusts the peak power and FWHM according to the adjustment control signal generated by the peak power/FWHM regulator 20, thereby generating a high-speed laser pulse signal with specific peak power and FWHM. Furthermore, the peak power and FWHM of the high-speed laser pulse signal do not change with changes in temperature, process angle or power supply voltage.

In light of above embodiments, the high-speed laser pulse sampling and detecting circuit, system and method of the present disclosure are implemented by the laser driver, the photoelectric converter, the linear transimpedance amplifier, the low-speed ADC, the peak power/FWHM detector and the multi-phase clock generator, thereby achieving precise sampling and detecting of the high-speed laser pulse signal, so as to utilize the detection result to control the peak power and FWHM of the high-speed laser pulse generated by the laser driver to make sure that the peak power and FWHM do not change with changes in temperature, process angle or power supply voltage, thereby ensuring the precision and stability of the ranging functions of the entire LiDAR/3D sensing system. Accordingly, the present disclosure overcomes the shortcomings in the prior art and brings improvements to technical implementations such as autopilot, gesture recognition, and machine vision.

In accordance with some exemplary embodiments of the present disclosure, a high-speed laser pulse sampling and detecting circuit is provided. The sampling and detecting circuit includes: a laser driver for generating a laser pulse signal driven by a triggering signal; and a photoelectric converter, connected to the output end of the laser driver, used to convert the laser pulse signal into a current pulse signal; a linear transimpedance amplifier, connected to the output end of the photoelectric converter, used to amplify the current pulse signal then converted into a voltage pulse signal; a low-speed ADC, connected to the output end of the linear transimpedance amplifier, used for sampling the voltage pulse signal and performing analog-to-digital conversion under the driving of the sampling clock signal; a peak power/FWHM detector, connected to the output end of the low-speed ADC, for detecting the output signal of the low-speed ADC to obtain the peak power and FWHM of the laser pulse signal; a multi-phase clock generator, connected to the clock input end of the low-speed ADC, used to, according to the triggering signal, generate the sampling clock signal whose phase changes continuously with respect to the triggering signal.

In accordance with some exemplary embodiments of the present disclosure, the multi-phase clock generator includes: N series-connected delayers for sequentially delaying the triggering signal to generate N delay signals; and a counter, used to count once on each rising edge of the triggering signal, and for generating a path selection control signal according to the counting result.

In accordance with some exemplary embodiments of the present disclosure, the multi-phase clock generator includes a multiplexer. The multiplexer includes N selection paths. The input ends of the N selection paths are respectively connected to the output ends of the N delayers in a one-to-one correspondence, and the output ends of the N selection paths are used as the output ends of the multi-phase clock generator and are connected to the clock input end of the low-speed ADC. The control end of the multiplexer is connected to the output end of the counter, for sequentially opening the N selection paths according to a path selection control signal, thereby generating, according to the N delay signals, the sampling clock signal whose phase changes continuously with respect to the triggering signal. Optionally, the delay times of the N delayers are the same, and N is a positive integer greater than 1.

In accordance with some exemplary embodiments of the present disclosure, the multi-phase clock generator further includes: a DLL for generating a delay-controlling signal according to the reference clock signal to correct the delay times of the N delayers. Optionally, the DLL includes: N series-connected delay replication modules, used to delay the reference clock signal in sequence; a delay detection module, one input end of which is connected to the output end of the Nth delay replication module, the other input end of which is connected to the reference clock signal, and the output end of which is respectively connected to the N delay replication modules. The delay detection module is used to compare the delay value output of the Nth delay replication module with the period of the reference clock signal, and generate the delay-controlling signal according to the comparison result. Optionally, the delay times of the N delay replication modules are the same and are the same as the delay times of the N delayers. Optionally, the low-speed ADC includes: an asynchronous successive-approximation-register analog-to-digital converter.

In accordance with some exemplary embodiments of the present disclosure, the photoelectric converter includes: a transmitter photodiode and a receiver photodiode. The anode end of the transmitter photodiode is connected to the output end of the laser driver, the cathode end of the transmitter photodiode is grounded, and the receiver. The cathode end of the photodiode is connected to the power supply voltage, and the anode end of the receiver photodiode is connected to the input end of the linear transimpedance amplifier.

In accordance with some exemplary embodiments of the present disclosure, a high-speed laser pulse sampling and detection method is provided. The method includes: generating a laser pulse signal driven by a triggering signal, and converting the laser pulse signal into a current pulse signal; amplifying the current pulse signal and converting them into a voltage pulse signal; according to the triggering signal, generating a sampling clock signal whose phase changes continuously with respect to the triggering signal; and sampling the voltage pulse signal and performing analog-to-digital conversion under the driving of the sampling clock signal; detecting the signal after the analog-to-digital conversion to obtain the peak power and FWHM of the laser pulse signal.

Optionally, the method for generating the sampling clock signal, according to the triggering signal, whose phase changes continuously with respect to the triggering signal includes: sequentially delaying the triggering signal for N times to generate N delay signals; counting on each rising edge of the triggering signal to generate a count result and generating a path selection control signal based on the count result; sequentially outputting N delay signals according to the path selection control signal, thereby generating the sampling clock signal whose phase changes continuously with respect to the triggering signal. The triggering signal is delayed for the same delay time for N times, and N is a positive integer greater than 1. Optionally, the method for generating the sampling clock signal, according to the triggering signal, whose phase changes continuously with respect to the triggering signal further includes: generating a delay-controlling signal according to the reference clock signal, and correcting the delay times of the delayers respectively that generate the N delay signals.

Optionally, the method for generating the delay-controlling signal according to the reference clock signal includes: delaying the reference clock signal for N times in sequence; comparing the delay value output after the Nth delay with the period of the reference clock signal, and generating the delay-controlling signal according to the comparison result. Optionally, the delay times of the N times delaying of the reference clock signal is the same and the same as the delay times of each of the delaying of the triggering signal.

In accordance with some exemplary embodiments of the present disclosure, a LiDAR/3D sensing system is provided. The LiDAR/3D sensing system includes: a transmitter end and a receiver end. The transmitter end includes: the above-mentioned high-speed laser pulse sampling and detecting circuit, used for sampling and detecting the laser pulse signal to obtain their peak power and FWHM. Optionally, the transmitter end further includes: a peak power/FWHM regulator, connected to the output end of the peak power/FWHM detector and the control end of the laser driver, used for according to the detected peak power and FWHM generating an adjustment control signal to control the peak power and FWHM of the laser pulse signal output by the laser driver.

As described above, the present disclosure provides a high-speed laser pulse sampling and detecting circuit, a system, and a method. Embodiments of the present disclosure use laser driver, photoelectric converter, linear transimpedance amplifier, low-speed ADC, peak power/FWHM detector, and multi-phase clock generator to realize precisely sampling and detecting the high-speed laser pulse signal, so that the detection result can be used to control the high-speed peak power and FWHM of the laser pulse signal generated by the laser driver, and making it that the peak power and FWHM do not depend on the temperature, process angle or power supply voltage, thereby ensuring the accuracy and stability of the entire LiDAR/3D sensing system.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A laser pulse sampling and detecting circuit comprising:
   a laser driver which is driven by a triggering signal for generating a laser pulse signal;
   a photoelectric converter for converting the laser pulse signal into a current pulse signal;
   an amplifier for amplifying and converting the current pulse signal into a voltage pulse signal;
   an analog-to-digital converter (ADC) which is driven by a sampling clock signal for sampling the voltage pulse signal and performing analog-to-digital conversion on the voltage pulse signal, so as to obtain an output signal of the ADC;
   a detector for detecting the output signal of the ADC, so as to obtain peak power and full width at half-maximum (FWHM) of the laser pulse signal; and
   a clock generator for generating the sampling clock signal, wherein phase of the sampling clock signal consecutively changes with respect to the triggering signal,
   the clock generator further comprising:
      a plurality of delayers which are connected in a series connection and for sequentially delaying the triggering signal to generate a plurality of delay signals, and
      a multiplexer for sequentially outputting the plurality of delay signals according to a path selection control signal so as to generate the sampling clock signal, wherein the path selection control signal is generated by counting on each rising edge of the triggering signal.

2. The laser pulse sampling and detecting circuit according to claim 1, the clock generator further comprising a delay-locked loop (DLL), wherein the DLL generates a delay-controlling signal according to a reference clock signal so as to correct delay times of the plurality of delayers respectively.

3. The laser pulse sampling and detecting circuit according to claim 2, the DLL further comprising:
   a plurality of delay replication modules, wherein the plurality of delay replication modules are connected in a series connection, a total number of the plurality of delay replication modules is the same as a total number of the plurality of delayers, the plurality of delay replication modules are configured for sequentially delaying the reference clock signal; and
   a delay detection module, wherein the delay detection module generates the delay-controlling signal by comparing a delay value output of the last one of the plurality of delay replication modules to delay the reference clock signal and a period of the reference clock signal.

4. The laser pulse sampling and detecting circuit according to claim 3, wherein delay times of each of the plurality of delayers are the same as a first delay time.

5. The laser pulse sampling and detecting circuit according to claim 4, wherein delay times of each of the plurality of delay replication modules are the same as a second delay time.

6. The laser pulse sampling and detecting circuit according to claim 5, wherein the first delay time is the same as the second delay time.

7. The laser pulse sampling and detecting circuit according to claim 1, wherein delay times of each of the plurality of delayers are the same.

8. The laser pulse sampling and detecting circuit according to claim 1, wherein the ADC comprises an asynchronous successive-approximation-register analog-to-digital converter (SAR ADC).

9. The laser pulse sampling and detecting circuit according to claim 1, the photoelectric converter further comprising a transmitter photodiode and a receiver photodiode, wherein an anode end of the transmitter photodiode is connected to an output end of the laser driver, a cathode end of the transmitter photodiode is grounded, a cathode end of the receiver photodiode is connected to a power supply, an anode end of the receiver photodiode is connected to an input end of the amplifier.

10. A Light Detection and Ranging (LiDAR) system, the LiDAR system comprising a transmitter end and a receiver end, the transmitter end further comprising a regulator and the laser pulse sampling and detecting circuit according to claim 1, wherein the regulator is connected to an output end of the detector and a control end of the laser driver, the regulator is configured for controlling the laser driver according to the peak power and the FWHM of the laser pulse signal obtained by the detector.

11. A 3D sensing system comprising:
    a laser driver which is driven by a triggering signal for generating a laser pulse signal;
    a photoelectric converter for converting the laser pulse signal into a current pulse signal;
    an amplifier for amplifying and converting the current pulse signal into a voltage pulse signal;

an ADC which is driven by a sampling clock signal for sampling the voltage pulse signal and performing analog-to-digital conversion on the voltage pulse signal, so as to obtain an output signal of the ADC;

a detector for detecting the output signal of the ADC, so as to obtain peak power and FWHM of the laser pulse signal;

and a regulator for controlling the laser driver according to the peak power and the FWHM of the laser pulse signal obtained by the detector, wherein the sampling clock signal is generated by sequentially delaying the triggering signal by counting on each rising edge of the triggering signal to generate a count result and generating a path selection control signal based on the count result, phase of the sampling clock signal consecutively changes with respect to the triggering signal.

12. The 3D sensing system according to claim 11, wherein the sampling clock signal is generated by sequentially delaying the triggering signal, comprises: sequentially delaying the triggering signal for N times so as to generate N delay signals, where N is a positive integer greater than 1;

and sequentially outputting the N delay signals according to the path selection control signal so as to generate the sampling clock signal.

13. The 3D sensing system according to claim 12, wherein the triggering signal is delayed for the same delay time for N times.

14. The 3D sensing system according to claim 11, wherein the sampling clock signal is generated by sequentially delaying the triggering signal, comprises:

sequentially delaying the triggering signal by N delayers which are connected in a series connection, so as to generate N delay signals, where N is a positive integer greater than 1; and sequentially outputting the N delay signals according to the path selection control signal so as to generate the sampling clock signal, wherein the path selection control signal is generated by counting on each rising edge of the triggering signal, wherein delay times of each of the N delayers are the same.

15. The 3D sensing system according to claim 14, wherein delay times of each of the N delayers are corrected according to a delay-controlling signal respectively, wherein generating the delay-controlling signal comprises:

sequentially delaying a reference clock signal for N times, and comparing a delay value output after the reference clock signal is delayed for the Nth time and a period of the reference clock signal, so as to generate the delay-controlling signal.

16. The 3D sensing system according to claim 15, wherein delay times of each of the N delayers are the same as a first delay time, the reference clock signal is delayed for a second delay time for N times, the first delay time is the same as the second delay time.

17. A laser pulse sampling and detecting method comprising:

generating a laser pulse signal driven by a triggering signal, and converting the laser pulse signal into a current pulse signal;

amplifying and converting the current pulse signal into a voltage pulse signal;

sequentially delaying the triggering signal to generate a sampling clock signal by counting on each rising edge of the triggering signal to generate a count result and generating a path selection control signal based on the count result, sampling the voltage pulse signal driven by the sampling clock signal and performing analog-to-digital conversion on the voltage pulse signal so as to obtain a signal after analog-to-digital conversion, wherein phase of the sampling clock signal consecutively changes with respect to the triggering signal; and detecting the signal after analog-to-digital conversion, so as to obtain peak power and FWHM of the laser pulse signal.

18. The laser pulse sampling and detecting method according to claim 17, wherein sequentially delaying the triggering signal to generate the sampling clock signal comprises: sequentially delaying the triggering signal for N times so as to generate N delay signals, where N is a positive integer greater than 1;

and sequentially outputting the N delay signals according to the path selection control signal so as to generate the sampling clock signal.

19. The laser pulse sampling and detecting method according to claim 18, wherein the triggering signal is delayed for the same delay time for N times.

20. The laser pulse sampling and detecting method according to claim 17, wherein sequentially delaying the triggering signal to generate the sampling clock signal comprises:

sequentially delaying the triggering signal by N delayers which are connected in a series connection, so as to generate N delay signals, where N is a positive integer greater than 1; and sequentially outputting the N delay signals according to the path selection control signal so as to generate the sampling clock signal, wherein the path selection control signal is generated by counting on each rising edge of the triggering signal, wherein delay times of each of the N delayers are corrected according to a delay-controlling signal respectively, wherein generating the delay-controlling signal comprises: sequentially delaying a reference clock signal for N times, and comparing a delay value output after the reference clock signal is delayed for the Nth time and a period of the reference clock signal, so as to generate the delay-controlling signal, wherein delay times of each of the N delayers are the same as a first delay time, the reference clock signal is delayed for a second delay time for N times, the first delay time is the same as the second delay time.

\* \* \* \* \*